United States Patent
Erceg et al.

(10) Patent No.: US 11,723,009 B2
(45) Date of Patent: Aug. 8, 2023

(54) METHODS AND SYSTEMS FOR COEXISTENCE WITH LICENSED ENTITIES USING BEAM STEERING

(71) Applicant: AVAGO TECHNOLOGIES INTERNATIONAL SALES PTE. LIMITED, Singapore (SG)

(72) Inventors: Vinko Erceg, San Diego, CA (US); Ron Porat, San Diego, CA (US); Thomas Derham, San Diego, CA (US); Matthew J. Fischer, San Jose, CA (US); Christopher David Szymanski, Irvine, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 17/824,469

(22) Filed: May 25, 2022

(65) Prior Publication Data

US 2022/0295490 A1 Sep. 15, 2022

Related U.S. Application Data

(63) Continuation of application No. 15/907,182, filed on Feb. 27, 2018, now Pat. No. 11,452,096.
(Continued)

(51) Int. Cl.
*H04W 16/14* (2009.01)
*H04W 52/36* (2009.01)
(Continued)

(52) U.S. Cl.
CPC ....... *H04W 72/0453* (2013.01); *H04W 16/14* (2013.01); *H04W 52/243* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,743,708 B1 | 6/2014 | Robertson et al. | |
| 9,143,968 B1 | 9/2015 | Manku et al. | |

(Continued)

*Primary Examiner* — Joshua L Schwartz
(74) *Attorney, Agent, or Firm* — Foley & Lardner LLP

(57) ABSTRACT

Systems, methods, and devices for conducting wireless communication are provided. One method includes identifying a location of a device and obtaining spectrum usage data from a database. The spectrum usage data indicates a licensed entity licensed within an area including the location of the device to communicate across a first sub-band of frequencies within a frequency band, and one or more transmission characteristics of the transmissions of the licensed entity. The method further includes determining beam steering characteristics for wireless transmissions of the device within the frequency band using the spectrum usage data. The beam steering characteristics are determined using the transmission characteristics for the licensed entity and configured to reduce interference with the transmissions of the licensed entity within the frequency band caused by the wireless transmissions of the device. The method further includes conducting wireless transmissions over the frequency band using the beam steering characteristics.

20 Claims, 7 Drawing Sheets

Related U.S. Application Data

(60) Provisional application No. 62/464,952, filed on Feb. 28, 2017.

(51) Int. Cl.
| | |
|---|---|
| *H04W 52/42* | (2009.01) |
| *H04W 52/24* | (2009.01) |
| *H04W 84/12* | (2009.01) |
| *H04W 64/00* | (2009.01) |
| *H04W 72/0453* | (2023.01) |
| *H04W 72/541* | (2023.01) |
| *H04W 72/044* | (2023.01) |
| *H04W 72/04* | (2023.01) |
| *H04W 72/08* | (2009.01) |

(52) U.S. Cl.
CPC ......... *H04W 52/367* (2013.01); *H04W 52/42* (2013.01); *H04W 72/046* (2013.01); *H04W 72/541* (2023.01); *H04W 64/00* (2013.01); *H04W 84/12* (2013.01); *Y02D 30/70* (2020.08)

(56) References Cited

U.S. PATENT DOCUMENTS

| | | |
|---|---|---|
| 2004/0047324 A1 | 3/2004 | Diener |
| 2004/0137915 A1 | 7/2004 | Diener et al. |
| 2005/0066044 A1 | 3/2005 | Chaskar et al. |
| 2007/0270175 A1 | 11/2007 | Malladi et al. |
| 2008/0076450 A1 | 3/2008 | Nanda et al. |
| 2009/0191910 A1 | 7/2009 | Athalye et al. |
| 2010/0093307 A1 | 4/2010 | Hui et al. |
| 2010/0105400 A1 | 4/2010 | Palmer |
| 2010/0302948 A1 | 12/2010 | Sawai et al. |
| 2010/0329132 A1 | 12/2010 | Raghothaman et al. |
| 2011/0286401 A1 | 11/2011 | Wijting et al. |
| 2012/0120887 A1 | 5/2012 | Deaton et al. |
| 2012/0157119 A1 | 6/2012 | Shu |
| 2012/0185429 A1 | 7/2012 | Shu et al. |
| 2013/0035108 A1 | 2/2013 | Joslyn et al. |
| 2013/0040649 A1* | 2/2013 | Soto Matamala .... H04W 64/00 455/452.1 |
| 2013/0259475 A1 | 10/2013 | Ji et al. |
| 2014/0140705 A1 | 5/2014 | Chang et al. |
| 2015/0099551 A1 | 4/2015 | Bohaty |
| 2015/0288800 A1 | 10/2015 | Pianese et al. |
| 2016/0028455 A1 | 1/2016 | Ma et al. |
| 2016/0029227 A1 | 1/2016 | Aboul-Magd et al. |
| 2016/0183269 A1 | 6/2016 | Badic et al. |
| 2016/0249224 A1 | 8/2016 | Prasad et al. |
| 2017/0164211 A1 | 6/2017 | Ho et al. |
| 2017/0188314 A1 | 6/2017 | Mueck et al. |
| 2018/0027506 A1 | 1/2018 | Pasulka et al. |
| 2018/0035396 A1 | 2/2018 | Stirling-Gallacher et al. |
| 2018/0063748 A1 | 3/2018 | Ling et al. |

* cited by examiner

METHODS AND SYSTEMS FOR COEXISTENCE WITH LICENSED ENTITIES USING BEAM STEERING

CROSS-REFERENCE TO RELATED APPLICATIONS

This application is a continuation of U.S. patent application Ser. No. 15/907,182, filed Feb. 27, 2018, which claims priority to and the benefit of U.S. Provisional Application No. 62/464,952, filed Feb. 28, 2017, entitled "METHODS AND SYSTEMS FOR COEXISTENCE BETWEEN NARROWBAND AND WIDEBAND WIRELESS COMMUNICATION SYSTEMS", assigned to the assignee of this application, and both which are incorporated herein by reference in their entireties for all purposes.

FIELD OF THE DISCLOSURE

The present description relates generally to wireless communication systems. More specifically, the present description relates to methods and systems for allowing transmissions in a same general frequency range as licensed entities.

BACKGROUND

There is a trend towards greater sharing of electromagnetic spectrum between different wireless communication networks and technologies, since it tends to promote greater and more efficient use of spectrum, which is a scarce resource. Governmental entities or other agencies tasked with allocating and monitoring use of spectrum, such as the United States Federal Communications Commission (FCC), may license certain entities to operate within a particular area (e.g. fixed service satellite, fixed service microwave, mobile cable/broadcast/television, radar, etc.). In such circumstances, the licensee typically licenses use of the spectrum with an expectation that its transmissions will not be impacted by substantial interference within the licensed band. Therefore, unlicensed users may be prohibited from operating on the licensed band unless the unlicensed users have a mechanism for helping ensure that their transmissions will not substantially interfere with the transmissions of the licensed entity.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements, throughout. In the drawings, like reference numbers generally indicate identical, functionally similar, and/or structurally similar elements.

DETAILED DESCRIPTION

Figure 1:
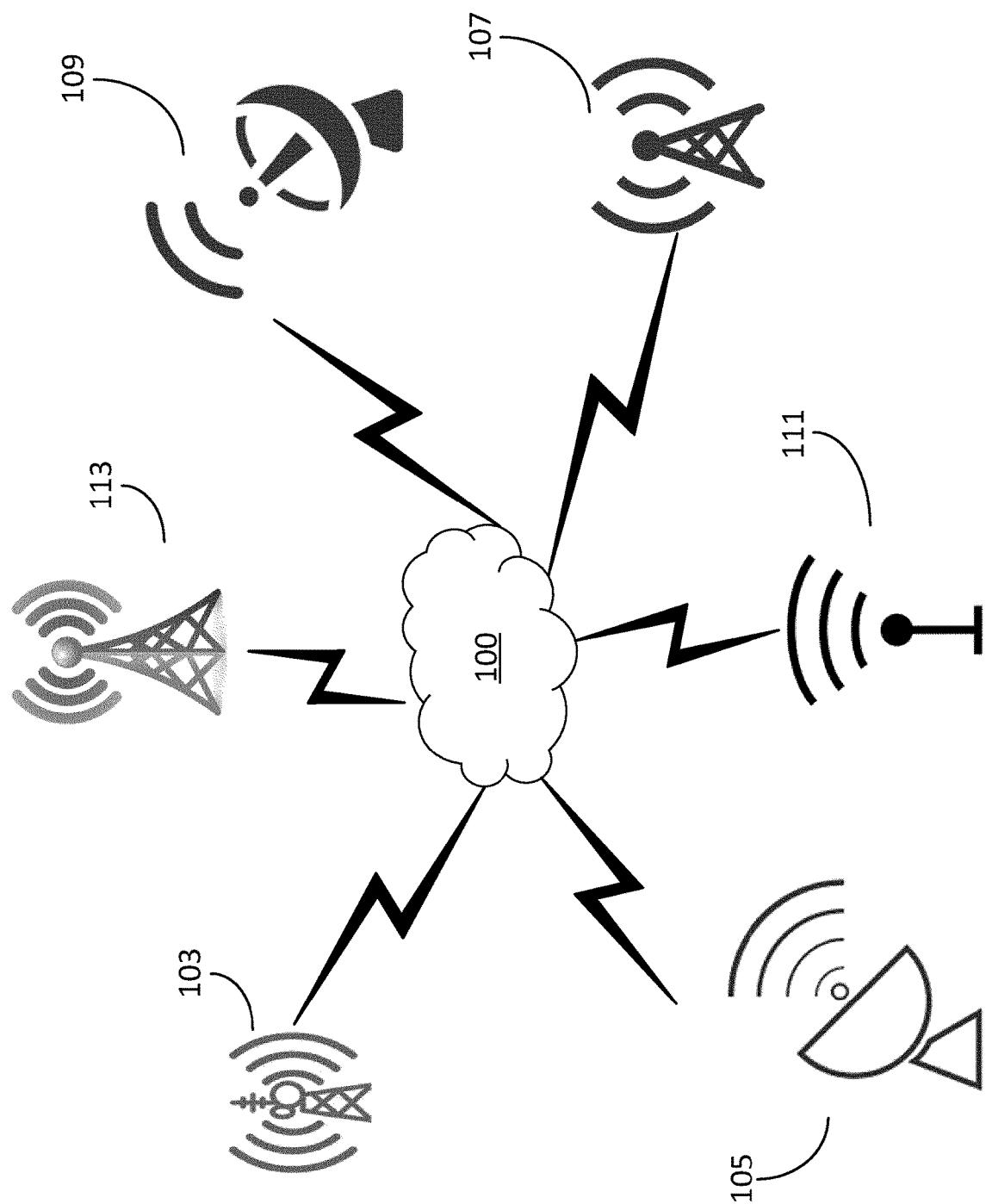
FIG. 1 is a diagram depicting an example spectrum access system (SAS) for coexistence between licensed and unlicensed entities (e.g., narrowband and wideband wireless communication systems) according to an illustrative implementation.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more implementations.

Coexistence between licensed and unlicensed users on a particular frequency band utilizes sharing of electromagnetic spectrum according to some implementations. Spectrum may be unlicensed, licensed on a non-exclusive basis, or exclusively licensed to one or more entities operating one or more systems in the spectrum. In some implementations, such spectrum sharing may utilize rules placed on the transmission parameters of one or more of the systems.

The identification of licensed systems can be performed in several ways, such as direct sensing of the transmissions of the second system, being informed by a third party (e.g., a governmental entity, such as the FCC) that the second system exists at a proximate location such that (mutual) interference may occur, or in another manner. In some implementations, the third party provides access to a centralized database system that includes data indicating the locations and transmission/reception characteristics of the second system.

In some implementations, the second system does not transmit continuously, and therefore the first and second systems are able to coexist by sharing spectrum in the time domain. However, if the first system is unable to directly detect the transmissions of the second system, and does not have any other mechanisms by which to become aware in real-time of the timing of the transmissions (e.g. duty cycle) of the second system, time-domain coexistence becomes infeasible. In such cases, the most tractable method of coexistence (when simultaneous interference would otherwise create an intolerable level of interference) is for the two systems to transmit in different sub-bands or channels of the spectrum.

When the two systems coexist by transmitting on mutually exclusive channels within the spectrum, the second system uses a fixed bandwidth channel within the spectrum, and the first system uses as much of the remaining spectrum as possible in order to increase the communications throughput (data rate) according to some implementations. In some implementations, there are one or more other systems with which the first system coexists by transmitting on as much as possible of the spectrum that is unused by the other systems. In some implementations, the first system transmits simultaneously on multiple non-contiguous channels within the spectrum using various techniques, such as carrier aggregation, channel bonding, or non-contiguous orthogonal frequency-division multiple access (OFDMA) scheduling. The channel bonding technique utilizes transmitters and receivers that have multiple transmit/receive chains, each operating on a unique contiguous part of the spectrum according to some implementations. The non-contiguous OFDMA scheduling technique utilizes transmitters and receivers that have just a single wideband transmit/receive chain, where signals are only transmitted on OFDMA subcarriers pertaining to parts of the spectrum that are unused by the other devices according to some implementations.

In mobile communication systems (such as Wi-Fi, LTE, etc.), centralized transmission rules are applied to ensure coexistence (e.g. using a database) according to some implementations. In some implementations, network infrastructure nodes have permanent connection to the database and are configured as master controllers for transmissions conducted by the communication system. In some implementations, client devices have transient connectivity due to mobility and are configured as "slave" or "dependent" devices, such that the client devices are only allowed to transmit under rules that are indicated by the master network infrastructure nodes.

For example, in the IEEE 802.11 standard, Dynamic STA Enablement (DSE) provides a mechanism whereby client devices (STAs) are not allowed to transmit on certain channels/spectrum until they request and are granted "enablement" from an infrastructure node (AP) by exchange of DSE Enablement frames. The enablement grant from AP entitles the STA to transmit only for the purpose of communicating with the granting AP, and allows that AP to specify the maximum transmission power that the STA is allowed to use for those transmissions (in DSE Power Constraint frame).

For example, in IEEE 802.11 standard, Geolocation Database Dependent (GDD) enablement provides a similar mechanism to DSE. GDD enablement enables response based on information obtained from a centralized database. The enabling response contains a specific list of channels within spectrum on which the client device is allowed to operate, and a maximum transmission power pertaining to each of those channels according to some implementations. In the event that the client device is enabled to use multiple channels, and the AP is operating on those multiple channels by contiguous or non-contiguous channel bonding, the client device transmits on those multiple channels simultaneously according to some implementations. The client device can, once enabled, request an update on the allowable channels based on indication of its current location (using Channel Availability Query—CAQ procedure). This feature supports providing information on spectrum in a so-called "TV White Space" spectrum up to 698 MHz (White Space Map Information) according to some implementations.

Various systems and methods are provided in the present disclosure for coexistence with licensed entities using spectrum puncturing, power modification, and/or beam sharing. Various implementations utilize spectrum usage data obtained from a database. The spectrum usage data includes data regarding one or more licensed entities licensed to operate in a particular geographic area. The spectrum usage data can include a transmission and/or reception location of the licensed entities, a transmission power, an area in which the licensed entities are licensed to transmit, spectrum data regarding the licensed spectrum (e.g., the frequency band(s) over which the entity is licensed to transmit), data regarding directionality of the transmissions, and/or other data. In some implementations, the database is maintained or administered by a government entity (e.g., the FCC) or another entity authorized to provide the database by the government entity.

In some implementations, a wireless device uses the spectrum usage data to conduct transmissions in a frequency band near a licensed band using a spectrum puncturing technique. In some such implementations, the wireless device determines a licensed entity licensed to transmit in a particular sub-band of a frequency band in an area including the location of the wireless device. The wireless device disables transmissions over the particular sub-band and conducts transmissions over portions of the frequency band proximate/adjacent to the licensed sub-band. This allows the wireless device to still utilize the overall frequency band without impermissibly interfering with the transmissions of the licensed entity on the licensed sub-band.

In some implementations, a wireless device additionally, or alternatively, modifies a transmission power of transmissions of the wireless device in or adjacent to the licensed sub-band. The wireless device can utilize spectrum usage data from the database to estimate a transmission power that would result in interference at an intended receiver of the licensed entity of less than a threshold interference level. In some implementations, the database may specify the threshold level and/or provide transmission parameters (e.g., power levels) that wireless devices operating in the geographic area are required to use.

In some implementations (e.g., where the licensed entity is a fixed service, such as a fixed satellite or microwave service, and directionality of the transmissions of the licensed entity are predetermined), a wireless device additionally, or alternatively, receives transmission characteristics of the licensed entity, such as directionality information, from the database and utilizes the information to avoid impermissible interference using a beam forming technique. In some such implementations, the wireless device determines a beam path of the licensed transmissions using the spectrum usage data from the database and/or by detecting transmissions from the licensed entity. The wireless device can modify parameters of its own transmissions to avoid interference with the licensed transmissions using the directionality of those transmissions. For example, in some implementations, the wireless device (e.g., an access point) has multiple different antennas and chooses a subset of the antennas on which to transmit based on the antennas which will result in a directionality that will not cause an impermissible level of interference with the licensed entities. In various implementations, the wireless device may modify the polarization, elevation, azimuth, or other parameters of transmissions to avoid interference.

Referring to FIG. 1, a diagram depicts an example spectrum access system (SAS) 100 for coexistence between licensed and unlicensed entities (e.g., narrowband and wideband wireless communication systems) according to an illustrative implementation. In some implementations, the SAS 100 can be wirelessly connected to multiple communication systems that use one or more wireless communication networks and technologies, such as LTE communication system 103, satellite communication system 105, microwave communication system 107, radar communication system 109, WiFi communication system 111, and television communication system 113.

The SAS 100 includes a database. The database includes spectrum usage data of one or more communication systems that provide incumbent services within one or more spectrum ranges according to some implementations. The spectrum usage data can include, but is not limited to, spectrum information, geographic information, and/or transmission information of each incumbent service. For example, the SAS 100 can include a list of incumbent services and a specific geographic location and a transmission power used by each incumbent service according to some implementations.

In some implementations, the SAS 100 receives location data from a communication device (e.g., an AP, a client device such as a smartphone, etc.). In some implementations, the SAS 100 receives a request from the communication device for spectrum usage data associated with the location of the communication device and a specific frequency band. The SAS 100 retrieves spectrum usage data associated with the location of the communication device and the specific frequency band, and provides the spectrum usage data to the communication device. The spectrum usage data indicates information about transmissions of one or more other communication devices operated by licensed entities who have been granted a license to operate with a particular frequency range. The communication device is unlicensed to operate within the frequency range. In some implementations, the SAS 100 may provide a full database for a particular geographic regions or the entirety of the database without receiving the location of the communication device.

In some implementations, the spectrum usage data indicates a list of incumbent services provided by the one or more licensed entities of the second communication system within an area including the location of the communication device across one or more sub-bands of frequencies within a frequency band. In some implementations, the spectrum usage data indicates transmission power associated with each of the one or more incumbent services. In some implementations, the spectrum usage data includes a positive list indicating one or more sub-bands of frequencies that can be used for transmission in the area and a negative list indicating one or more sub-bands of frequencies that cannot be used for transmission in the area, or cannot be used without taking measures to ensure that the transmissions of the licensed entities are not degraded due to an impermissible level of interference from unlicensed devices. In some implementations, the one or more sub-bands of frequencies on the negative list are reserved for fixed services (e.g., services provided by licensed entities). In some implementations, the spectrum usage data may include only the negative list (e.g., such that devices can assume they are free to operate in the frequencies not specifically identified in the negative list) or the positive list (e.g., such that devices can assume they are not allowed to operate in the frequencies not specifically identified in the positive list without taking measures to avoid interfering with devices licensed to operate in such frequencies).

In some implementations, the communication device can use the spectrum usage data from the SAS 100 to avoid transmission on the sub-band of frequencies on the negative list and only transmit signals on the sub-band of frequencies on the positive list. In this way, the communication device can share the frequency band with the second communication system without interfering with any incumbent services provided by the second communication system. For example, for a particular frequency band, the communication device may determine a first sub-band of frequencies on which the licensed entities are licensed to operate and a second sub-band of frequencies that are unlicensed, and the communication device may conduct transmissions only on part or all of the second sub-band. In some embodiments, the communication device may evaluate a spectral separation between a portion of the second sub-band adjacent to the first sub-band to determine whether the spectral separation is sufficient to avoid impermissible interference on the first sub-band if transmissions are performed on the adjacent portion of the second sub-band.

In some implementations, the communication device uses the spectrum usage to determine one or more sub-bands of frequencies within the frequency band on which one or more licensed entities of the second communication system are licensed to conduct communications. The communication device determines a modified transmission power for transmission on the determined one or more sub-bands of frequencies to reduce interference with the one or more licensed entities of the second communication system. The communication device conducts transmission on the determined one or more sub-bands of frequencies at the modified transmission power. In some implementations, the communication device also conducts transmission on one or more sub-bands of frequencies that are adjacent to the determined sub-bands of frequencies at the modified transmission power.

In some implementations, the communication device can further use transmission information of the spectrum usage data to determine beam steering characteristics for wireless transmissions within the frequency band. The communication device conducts transmissions using the beam steering characteristics to reduce interference with the transmissions of the licensed entities of the second communication system.

Figure 2:
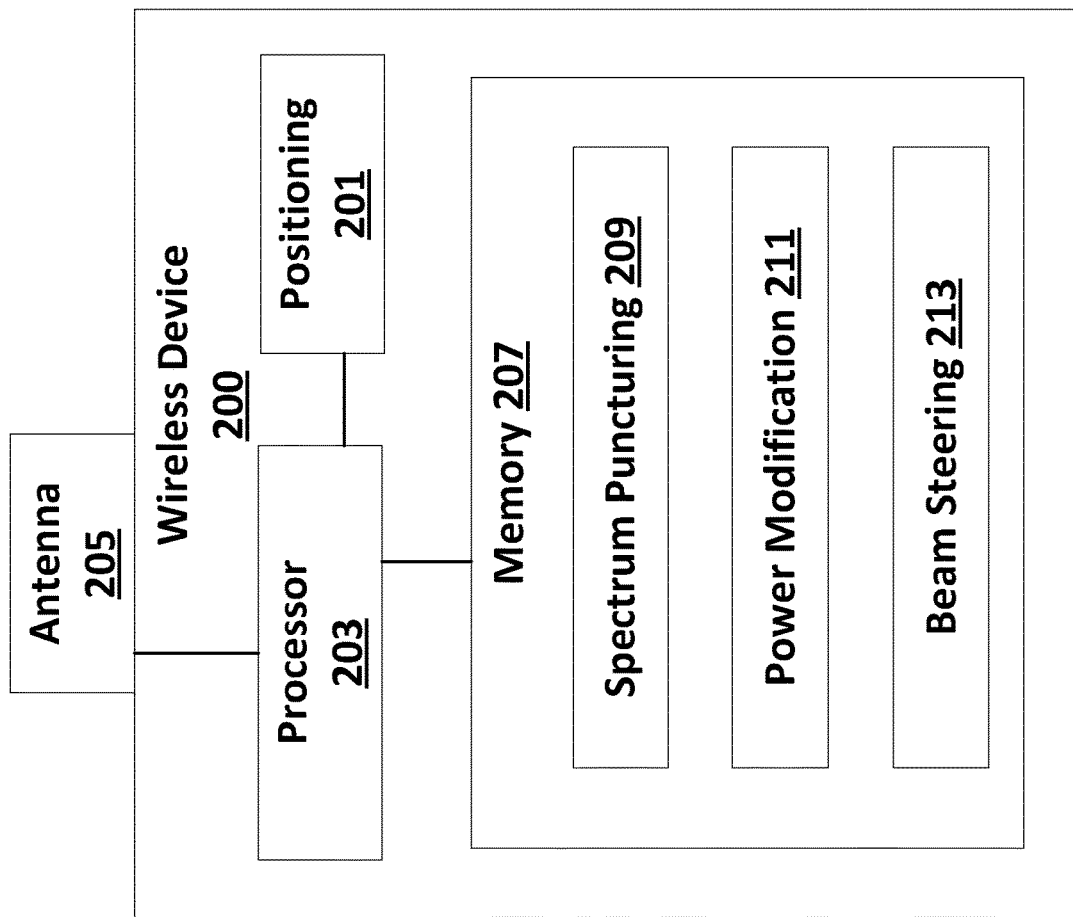
FIG. 2 is a block diagram depicting a device for conducting wireless communication according to an illustrative implementation.

Referring to FIG. 2, a block diagram of a device 200 for conducting wireless communication is depicted according to an illustrative implementation. In some implementations, the device 200 is an access point (AP) in a communication system. In some implementations, the device 200 is a client device in a communication system. The device 200 can be any devices that wirelessly connected to one or more other devices over a frequency band, such as a smartphone, tablet, computer (e.g., laptop), Internet of Things device such as a smartwatch, or any other device configured to communicate via wireless transmissions. The device 200 includes positioning circuitry 201, a processor 203, a memory 207, and an antenna 205.

In various implementations, the processor 203 is or includes a general purpose processor, a special purpose processor, a conventional processor, a digital signal processor (DSP), a plurality of microprocessors, one or more microprocessors in association with a DSP core, a controller, a microcontroller, an Application Specific Integrated Circuits (ASIC), a Field Programmable Gate Array (FPGA) circuit, any other type of integrated circuit (IC), a state machine, and the like. The processor 203 can perform signal coding, data processing, power control, input/output processing, and/or any other functionality that enables the device 200 to operate in a wireless environment, in some implementations. The processor 203 can be coupled to a transceiver (not shown), which can be coupled to the antenna 205. In some implementations, the processor 203 is integrated with a transceiver. The memory 207 can be any type of computer or machine-readable storage medium capable of storing instructions and/or other data in a form accessible by the processor 203. In various implementations, the memory 207 is, or includes, RAM, ROM, EEPROM, flash memory, magnetically recordable storage (e.g., a hard drive), or any other type of storage medium accessible to the processor 203.

The antenna 205 is configured to transmit signals to, and receive signals from, a base station and the SAS over one or more spectrum bands. In some implementations, the antenna 205 may be configured to transmit and/or receive any wireless signals (e.g., light, RI, WiFi, UV, LTE, etc.). In some implementations the antenna 205 includes a plurality of antennas, such as an antenna array. In some such implementations, individual antennas or groups of antennas can be individually selectable, such that transmissions can be performed on a subset of the antennas without performing transmissions on a portion of the antennas.

The positioning circuitry 201 is configured to identify a current location of the device 200 and provide the location information to the processor 203. In some implementations, the positioning circuitry 201 is configured to identify a location of the device 200 as a latitude and longitude. The positioning circuitry 201 can include one or more of, but is not limited to, a global positioning system (GPS), a cellular transceiver (e.g., where position can be determined via cellular triangulation or based on one or more cellular towers to which the device is connected), a short-range wireless transceiver such as a WiFi or Bluetooth transceiver (e.g., where position can be determined based on a known location of a device to which the positioning circuitry 201 is connected), etc.

In some implementations, the processor 203 is configured to transmit the location information to a spectrum access system (SAS) via the antenna 205 or another communication device of the processor configured to provide communications with the SAS. The processor 203 is configured to determine a plurality of channels over the frequency band to conduct wireless communication. In some implementations, each of the plurality of channels has a fixed width within the frequency band. The processor 203 can be configured to transmit the channel information indicating the plurality of channels to the SAS. In some implementations, the processor 203 transmits a request for spectrum usage data along with the location information. In other implementations, the processor 203 receives data for a larger geographic area from the SAS without providing the location data to the SAS, and the processor 203 filters or otherwise processes the information to determine the spectrum usage data pertinent to the current location of the device 200.

In some implementations, in response to transmitting the request for spectrum usage data and the location information, the processor 203 receives spectrum usage data from the SAS for the relevant area including or proximate to the location of the device 200. The spectrum usage data indicates a list of active services provided by one or more entities within an area including the location of the device 200 across one or more sub-bands of frequencies within the frequency band. In some implementations, the one or more entities are licensed entities that are licensed to communicate across the one or more sub-bands of frequencies within the frequency band. In some implementations, the one or more entities include unlicensed entities that actively communicate over one or more sub-band of frequencies of the frequency band. The spectrum usage data can indicate transmission power associated with each of the one or more active services. In some implementations, the spectrum usage data includes a positive list indicating one or more sub-bands of frequencies that can be used for transmission in the area and a negative list indicating one or more sub-bands of frequencies that cannot be used for transmission in the area, or cannot be used without mitigating activity to prevent interference with existing entities, such as entities approved or licensed to transmit within the sub-bands. In some implementations, the one or more sub-bands of frequencies on the negative list are reserved for fixed services (e.g., services provided by licensed entities).

The memory 207 can include one or more modules implemented as computer or machine-readable instructions that are executable by the processor 203 to perform functions of the device 200. In some implementations, the memory 207 includes one or more of a spectrum puncturing module 209, a transmission power modification module 211, and/or a beam steering module 213. The processor 203 is connected to the memory 207 and configured to execute various instructions stored in various modules of the memory 207. In some implementations, the processor 203 stores the received spectrum usage data in the memory 207.

The spectrum puncturing module 209 is configured to prevent interference with licensed entities by disabling transmission on licensed frequencies and identifying sub-bands proximate the licensed frequencies on which transmissions can be conducted. The spectrum puncturing module 209 determines a first set of one or more of the plurality of channels containing the first sub-band of frequencies over which the licensed entity is licensed to communicate using the spectrum usage data. The spectrum puncturing module 209 conducts transmissions on a second set of one or more of the plurality of channels that do not contain the first sub-band of frequencies. The spectrum puncturing module 209 further disables wireless transmissions on the first set of channels. In some implementations, the second set of channels includes a first subset of channels below the first set of channels and a second subset of channels above the first set of channels. In some implementations, the second set of channels can include channels only above or below the first set of channels.

The transmission power modification module 211 is configured to prevent interference with licensed entities by modifying the transmission power of the device 200 on frequencies within and/or adjacent to the licensed sub-band. The transmission power modification module 211 determines a modified transmission power using the spectrum usage data. The modified transmission power is configured to reduce interference with the licensed entity on the first sub-band. The transmission power modification module 211 conducts wireless transmission on at least one of a first set of one or more of the plurality of channels containing the first sub-band or an adjacent channel that is adjacent to the first set of channels at the modified transmission power. In some implementations, the transmission power modification module 211 disables wireless transmissions on the first set of channels and conduct wireless transmission on the adjacent channel at the modified transmission power.

The beam steering module 213 is configured to prevent interference with licensed entities by adjusting parameters of transmissions of the device 200 (e.g., beam steering parameters) to reduce interference based on the directionality of the licensed transmissions. The spectrum usage data can indicate one or more transmission characteristics of the transmission of the licensed entity including data indicating a source location and a directionality of the transmissions. In some implementations, the spectrum usage data also indicates beam steering requirements for transmissions in the frequency band within the area.

The beam steering module 213 determines whether the device 200 is within a beam path of the licensed entity based on the source location and directionality of the transmission of the licensed entity indicated by the transmission characteristics of the spectrum usage data. Upon determining the device 200 is within the beam path of the licensed entity, the beam steering module 213 modifies the beam characteristics for the wireless transmissions of the device 200 to reduce interference based on the beam path of the licensed entity. The beam steering module 213 determines beam steering characteristics for wireless transmissions of the device 200 within the frequency band using the transmission characteristics for the licensed entity using the spectrum usage data. The beam steering module 213 conducts wireless transmissions over the frequency band using the beam steering characteristics. The beam steering characteristics can include, but are not limited to, a beam orientation, a beam polarization, a beam elevation, a beam azimuth, and a beam cross-polarization discrimination. In some implementations, the beam steering module 213 determines the beam steering characteristics using beam steering requirements expressly or implicitly provided within the spectrum usage data.

In some implementations, when the antenna 205 includes a plurality of antennas, the beam steering module 213 determines a subset of the antennas to use for the wireless transmissions based on a directionality of the wireless transmission of the antennas.

Figure 3:
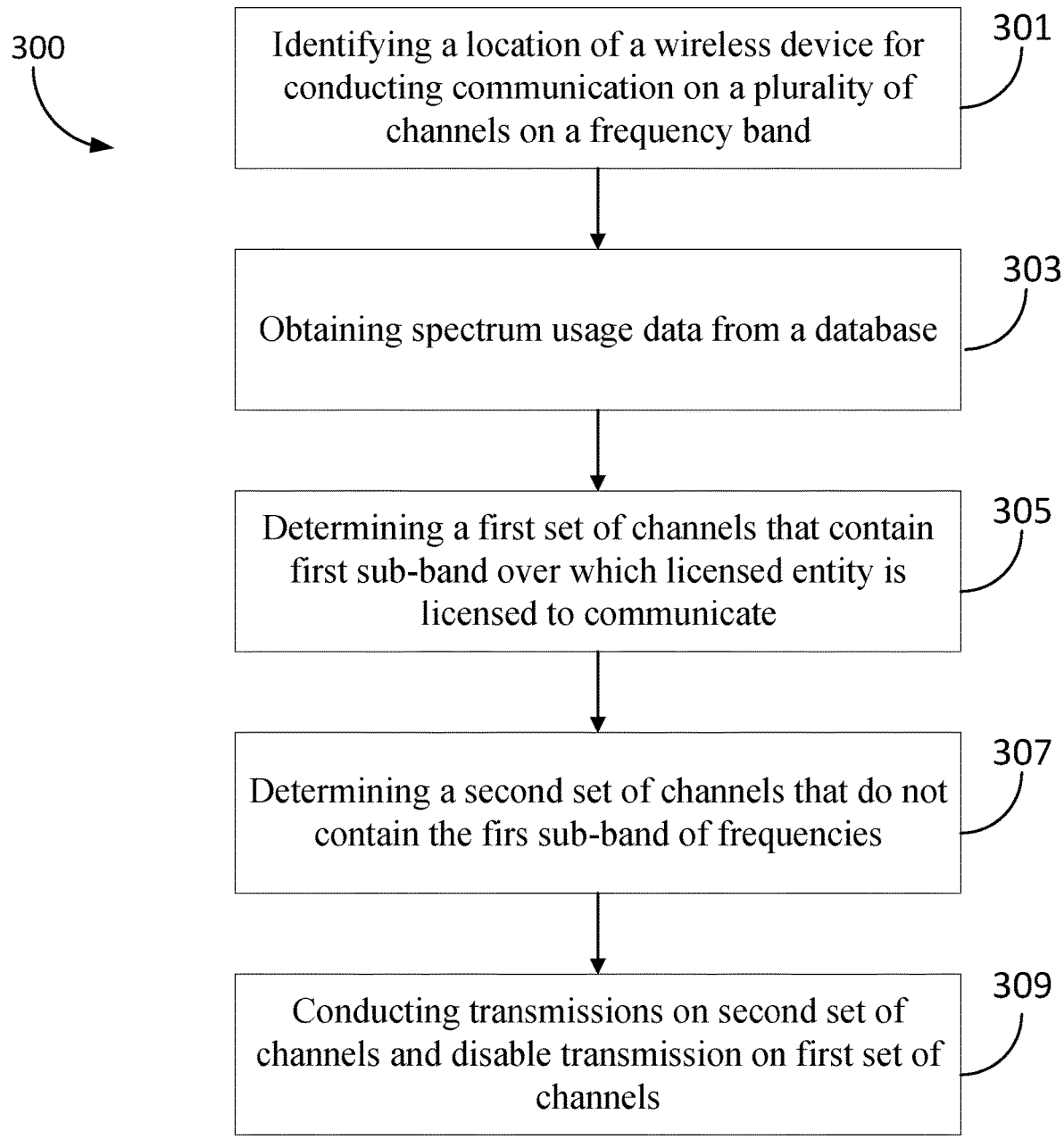
FIG. 3 is a flow diagram depicting a spectrum puncturing process according to an illustrative implementation.

Referring to FIG. 3, a flow diagram of a spectrum puncturing process 300 is depicted according to an illustrative implementation. In some implementations, the spectrum puncturing process 300 may be implemented using the spectrum puncturing module 209 of the device 200.

At operation 301, the wireless device identifies the location of the device. The location of the device is identified using a positioning circuitry of device. In some implementations, the location of the device is identified using positioning data received from other devices. In some implementations, the location of the device is transmitted to a system maintaining a database of spectrum usage in one or more geographic areas. For example, the location may be provided as part of a query from the device to a spectrum access system, and the spectrum access system may respond to the query with spectrum usage data relevant to an area including or proximate to the location. In some implementations, the device may use the determined location to filter data received from the database that includes a larger geographic area to determine the data relevant to the location.

At operation 303, the wireless device receives spectrum usage data from the spectrum access system. The spectrum access system includes a database used to store the data. The received spectrum usage data is associated with wireless transmissions at an area including the location of the wireless device. The spectrum usage data indicates a licensed entity licensed within the area to communicate across a first sub-band of frequencies within the frequency band.

At operation 305, the first set of one or more of the plurality of channels is determined by including channels that contains the first sub-band of frequencies over which the licensed entity is licensed to communicate. In some implementations, the first set of one or more of the plurality of channels are determined by including the first sub-band of frequencies and one or more sub-bands of frequencies adjacent to the first sub-band of frequencies.

At operation 307, the second set of one or more of the plurality of channels is determined by excluding channels from the first set of one or more of the plurality of channels. The second set of one or more of the plurality of channels does not overlap with the first set of one or more of the plurality of channels and does not include the first sub-band of licensed frequencies. In some implementations, the wireless device "punctures" the frequency band by determining one or more channels below the first set channels and one or more channels above the first set of channels to include in the second set of channels over which transmissions are conducted. In such implementations, transmissions can be conducted over a substantial portion of the frequency band and a frequency hole in which transmissions are disabled can be provided for the first set of frequencies to avoid interference with the licensed entity. In some implementations, the second set of frequencies is entirely above or below the first set, such that only an upper frequency sub-band or lower frequency sub-band is "punctured". In some implementations, the second set of frequencies forms a second sub-band larger than the first sub-band, and the wireless device determines a portion of the second sub-band that does not include the first sub-band and conducts transmissions on that portion of the second sub-band.

In some implementations, the wireless device determines channels to include in the second set of channels based in part on a spectral separation between the licensed sub-band and channels having frequencies adjacent to the frequencies of the first set of channels. For example, the wireless device can determine a spectral separation between a lowest frequency in the licensed sub-band and a highest frequency in a channel adjacent to the channel of the first set of channels that includes the lowest licensed frequency. In some implementations, the wireless device determines whether to include the adjacent channel in the second set of channels over which transmissions are to be conducted based on the spectral separation. In some such implementations, the wireless device determines whether the spectral separation exceeds a threshold level. If it does, the wireless device includes the adjacent channel in the second set of channels. If it does not, the wireless device excludes the adjacent channel in the second set of channels and instead includes the adjacent channel in the channels over which transmissions are disabled. In some embodiments, the wireless device determines whether to include the adjacent channel in the second set of channels based on whether the wireless transmissions on the adjacent channel are likely to cause interference on the licensed sub-band greater than a threshold level of interference. In some such embodiments, the wireless device estimates an anticipated level of interference at an intended receiver of the transmissions of the licensed entity based on the spectrum usage data from the database and allows transmissions on the adjacent channel if the anticipated level of interference is less than the threshold level and otherwise disables transmissions on the adjacent channel. In some such embodiments, the spectrum usage data used to estimate the anticipated interference includes, but is not limited to, relative geographic locations of the wireless device and the transmissions of the licensed entity, a power spectral energy over distance of the licensed transmissions, directionality of the licensed transmissions, antenna gain of the antenna(s) used by the licensed entity, channelization of the licensed transmissions, etc.

At operation 309, the wireless device conducts wireless transmissions on the second set of channels and disables wireless transmissions on the first set of channels.

Figure 4:
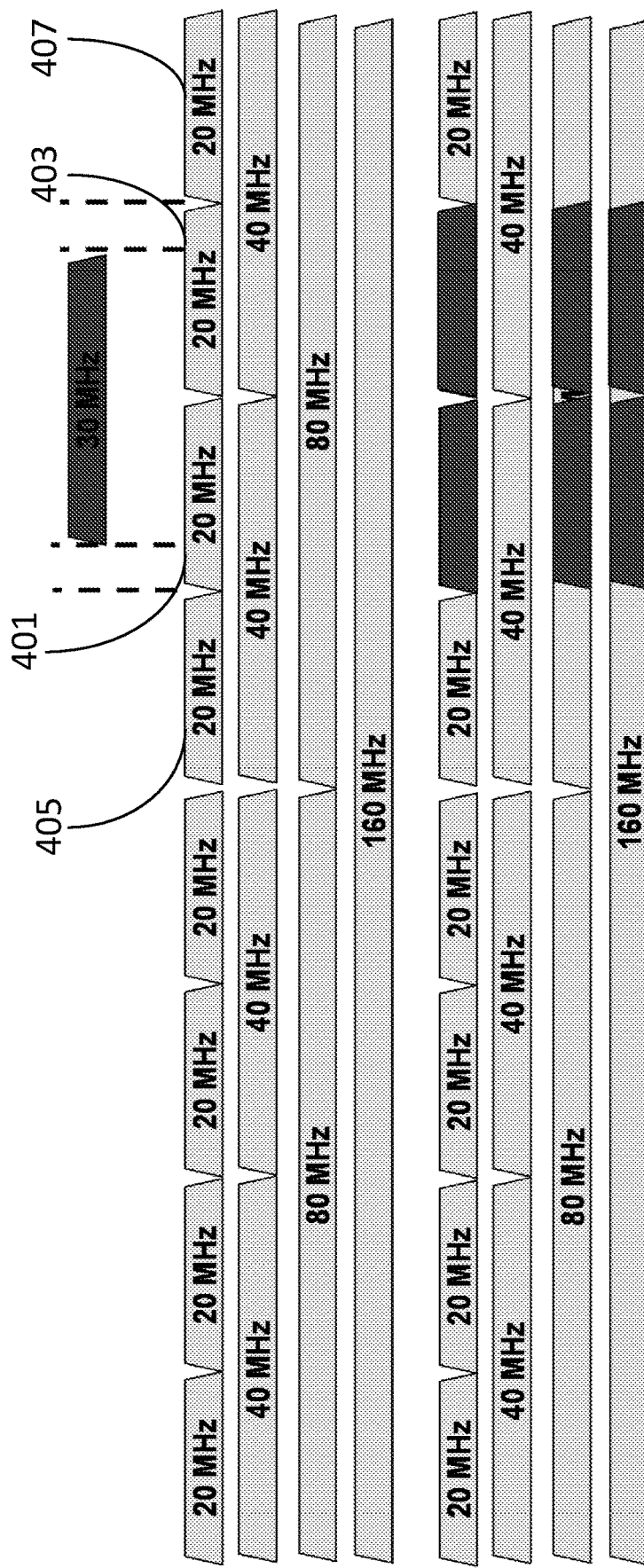
FIG. 4 is a spectrum usage diagram illustrating application of the spectrum puncturing process of FIG. 3 according to an illustrative implementation.

Referring now to FIG. 4, a spectrum diagram is shown illustrating implementation of the spectrum puncturing technique of FIG. 3 according to an illustrative example. The wireless device is configured to conduct wireless transmissions over a plurality channels over a frequency band. Each of the plurality of channels has a fixed width of 20 MHz. In the embodiment shown in FIG. 4, the wireless device can be configured to operate in a mode that utilizes a transmission band having a bandwidth of 20 MHz, 40 MHz, 80 MHz, or 160 MHz. In some implementations, the wireless device may operate in a mode utilizing a transmission band having a width of at least 80 MHz. In some implementations, the wireless device may transmit in a frequency band that includes a frequency of 6.0 GHz. The wireless device obtains spectrum usage data from a database of the spectrum access system. The spectrum usage data indicates that there is another device in the area including the location of the wireless device and the other device is licensed to conduct transmissions over a 30 MHz band.

The wireless device determines a first set of channels, channels 401 and 403, having a range of frequencies that include the 30 MHz band reserved by the licensed entity. The wireless device then determines channels that do not include the 30 MHz licensed sub-band. In some implementations, the wireless device may operate in a 80 MHz mode and may determine one or more 20 MHz channels within the 80 MHz sub-band that do not include the frequencies of the 30 MHz licensed sub-band. In the illustrated implementation, the wireless device may determine that channels 405 and 407 are channels in which transmissions are to be performed and channels 401 and 403 are channels in which transmissions are to be disabled. In such an example, this allows the wireless device to achieve an improved throughput associated with using what is effectively a 40 MHz band while avoiding impermissible interference with the licensed entity. In some implementations, the wireless device may operate in a 160 MHz mode and may transmit on some or all of the six 20 MHz channels other than channels 401 and 403.

In some implementations, the wireless device may consider the predefined boundaries between allocated frequency blocks in determining a mode in which the wireless device can operate. For example, in some embodiments, the entire licensed sub-band can be required to fall within the sub-band in which the wireless device operates in order to apply the frequency puncturing technique. In the example illustrated within FIG. 4, the wireless device can be configured not to operate in a 40 MHz mode because the 30 MHz licensed sub-band would overlap a boundary of two 40 MHz predetermined channels. The wireless device can operate in either an 80 MHz mode or a 160 MHz mode because the 30 MHz licensed sub-band does not cross the boundary of the particular 80 MHz and 160 MHz channels.

In some implementations, the 20 MHz channels include one or more channels that are adjacent to the channels that overlap with the 30 MHz band, such as the 20 MHz channel 405 and the 20 MHz channel 407. In some implementations, the wireless device determines whether to include the channels 405 and 407 in the first set of channels in which transmissions are disabled or the second set of channels in which transmissions are conducted based on a spectral separation between the 30 MHz band and the 20 MHz channels. For example, the wireless device can determine whether the spectral separation is less than a predetermined threshold. Upon determining that the spectral separation is less than the threshold, the wireless device includes the adjacent channels 405 and 407 in the first set of channels. If it is determined that the spectral separation is greater than the threshold, the wireless device can include the adjacent channels 405 and 407 in the second set of channels. In the illustrated example, the threshold could be 2 MHz, and the spectral separation between the 30 MHz band and the adjacent channels 405 and 407 is approximately 5 MHz. Therefore, the wireless device includes adjacent channels 405 and 407 in the channels in which transmissions are allowed. If the threshold were 7 MHz, the wireless device would disable transmissions on the adjacent channels 405 and 407. In some embodiments, the wireless device may determine whether to allow or disable transmissions on the adjacent channels 405 and 407 based on an assessment of whether transmissions on the adjacent channels 405 and 407 would cause impermissible interference on the 30 MHz licensed sub-band (e.g., interference of greater than a threshold level).

Figure 5:
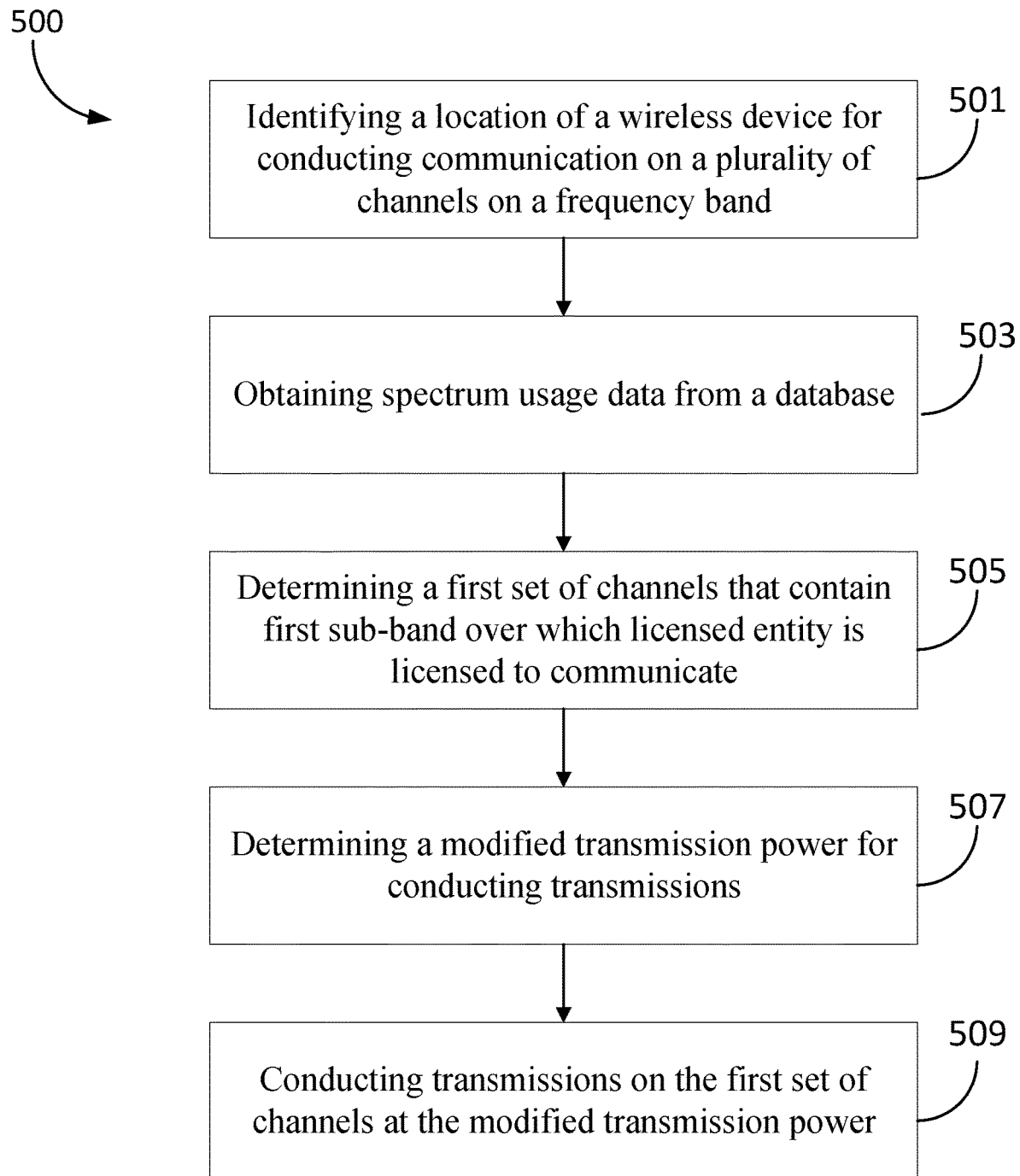
FIG. 5 is a flow diagram depicting a transmission power modification process according to an illustrative implementation.

Referring to FIG. 5, a flow diagram of a transmission power modification process 500 is depicted according to an illustrative implementation. In some implementations, the transmission power modification process 500 may be implemented using the transmission power modification module 211 of the device 200.

At operation 501, the wireless device identifies the location of the device. The location of the device is identified using a positioning circuitry of device. In some implementations, the location of the device is identified using positioning data received from other devices. In some implementations, the location of the device is transmitted to a system maintaining a database of spectrum usage in one or more geographic areas. For example, the location may be provided as part of a query from the device to a spectrum access system, and the spectrum access system may respond to the query with spectrum usage data relevant to an area including or proximate to the location. In some implementations, the device may use the determined location to filter data received from the database that includes a larger geographic area to determine the data relevant to the location.

At operation 503, the wireless device receives spectrum usage data from the spectrum access system. The spectrum access system includes a database used to store the data. The received spectrum usage data is associated with wireless transmissions at an area including the location of the wireless device. The spectrum usage data indicates a licensed entity licensed within the area to communicate across a first sub-band of frequencies within the frequency band.

At operation 505, the first set of one or more of the plurality of channels is determined by including channels that contains the first sub-band of frequencies over which the licensed entity is licensed to communicate. In some implementations, the first set of one or more of the plurality of channels are determined by including channels including the first sub-band of frequencies and one or more sub-bands of frequencies adjacent to the first sub-band of frequencies.

At operation 507, the wireless device determines a modified transmission power for conducting transmissions using the spectrum usage data. In some implementations, the modified transmission power is lower than a transmission power on other channels that do not include the first set of channels or is lower than a power at which the wireless device would typically transmit signals in the absence of the present interference mitigation features. The modified transmission power is determined using transmission information of the spectrum usage data, which indicates characteristics of the licensed entity transmissions, such as a source of the transmissions and/or a transmission power at which the licensed entity conducts transmission. The modified transmission power is lower than the transmission power of the licensed entity, in some implementations. The modified transmission power is determined based at least in part on a predicted or estimated level of interference caused at a receiver of the transmissions of the licensed entity due to the wireless transmission of the wireless device. In some implementations, the predicted or estimated level of interference may be calculated using one or more mathematical models and may be based on parameters such as the relative geographic locations of the wireless device in relation to the source and/or receiver of the transmissions, a power spectral density over distance of the licensed entity transmissions, a directionality of the licensed transmissions, a channelization of the licensed transmissions, and antenna gain of the licensed transmitting devices, etc. In some implementations, the wireless device determines the modified transmission power by determining a transmission power that, when applied to the model, results in an interference level at the receiver of the licensed transmissions that is less than a threshold level of interference (e.g., −90 dBm).

At operation 509, the wireless device conducts wireless transmissions on the first set of channels and/or on one or more channels adjacent the first set of channels at the modified transmission power. In some implementations, the wireless device disables transmission on the first set of channels and conducts transmissions on one or more channels that are adjacent to the first set of channels at the modified transmission power. In some embodiments, the transmissions on the channels that do not include the first set of channels can be conducted at a transmission power that is higher than the modified transmission power. For example, in wireless transmission protocols that allow for communication with different receiver devices at different transmission parameters within a frequency band, communication with devices in a portion of the band adjacent the licensed sub-band can be done at the modified transmission power, and communication with devices in a portion of the band distal from the licensed sub-band can be done at a higher transmission power.

Figure 6:
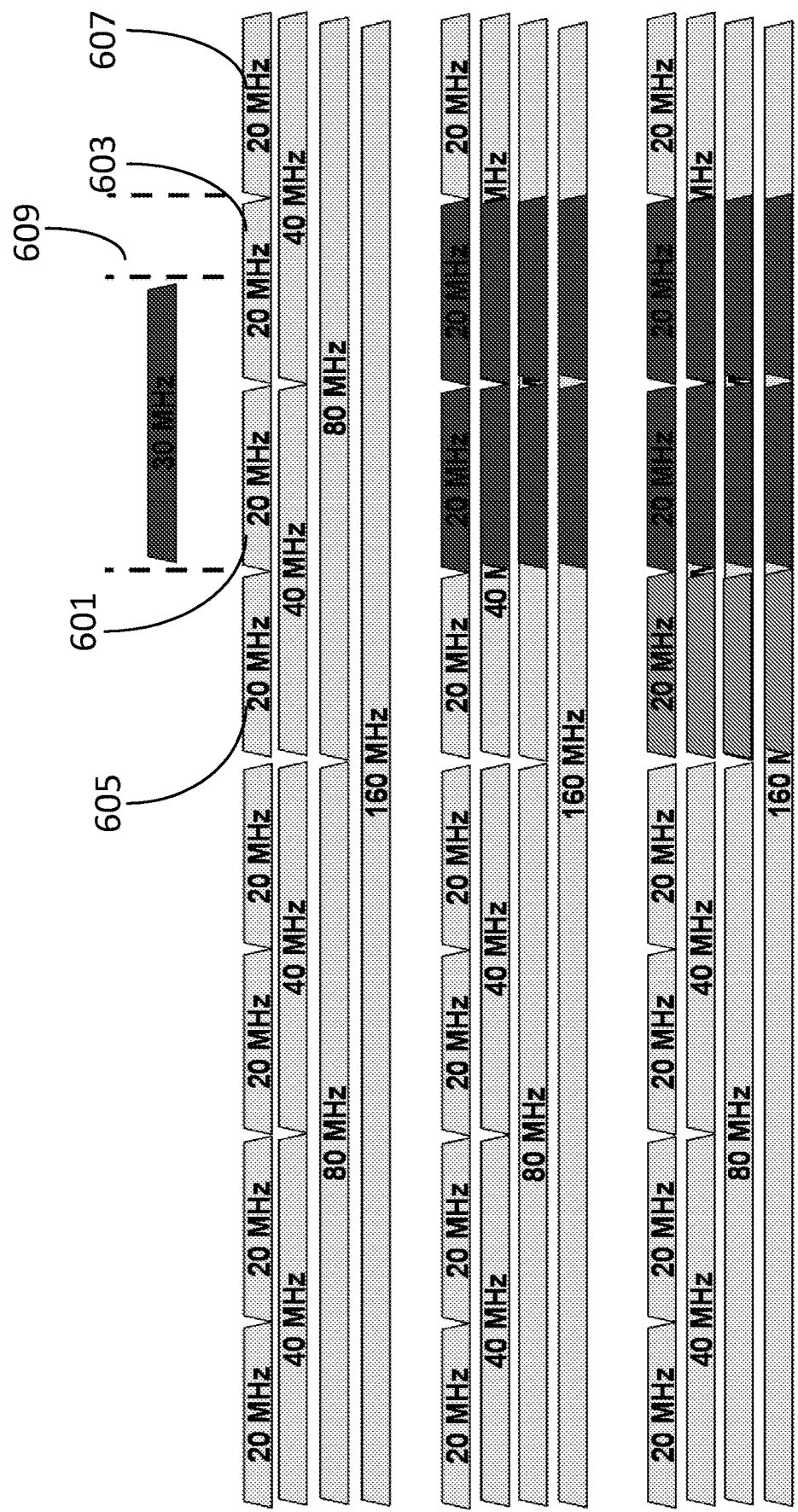
FIG. 6 is a spectrum diagram illustrates an implementation of the transmission power modification technique of FIG. 5 according to an illustrative example.

Referring to FIG. 6, a spectrum diagram illustrates an implementation of the transmission power modification technique of FIG. 5 according to an illustrative example. A wireless device is configured to conduct wireless transmissions over a plurality of channels of a frequency band. Each of the plurality of channels has a fixed width of 20 MHz.

For example, as shown in FIG. 6, a licensed entity is licensed to operate on a 30 MHz frequency band. The wireless device can be configured to operate in a mode that utilizes a transmission band having a bandwidth of 20 MHz, 40 MHz, 80 MHz, or 160 MHz. In some implementations, the wireless device may operate in a mode utilizing a transmission band having a width of at least 80 MHz. In some implementations, the wireless device may transmit in a frequency band that includes a frequency of 6.0 GHz. The wireless device obtains spectrum usage data from a database of the spectrum access system. The spectrum usage data indicates a location of the 30 MHz licensed sub-band within the frequency band. In this example, the 30 MHz band overlaps with portions of the 20 MHz channel 601 and the 20 MHz channel 603.

The wireless device determines a first set of channels (e.g., channels 601 and 603) including all the channels that overlap with the 30 MHz band which is reserved by a licensed entity. In some implementations, the first set of channels includes one or more channels that are adjacent to the channels that overlap with the 30 MHz band, such as the 20 MHz channel 605 and the 20 MHz channel 607. In some implementations, the wireless device determines whether to transmit on the channels 605 and 607 using the modified transmission power or a power level higher than the modified transmission power based on a determination of whether a spectral separation between the 30 MHz band and the 20 MHz channels is less than a predetermined threshold. Upon determining that the spectral separation is less than the threshold, the wireless device uses the modified power to transmit on the adjacent channel.

The wireless device determines a modified transmission power for the device to conduct transmissions on the first set of channels (e.g., channels 601 and 603) and/or on the adjacent channels (channels 605 and/or 607). The modified transmission power is lower than a transmission power on other channels that do not include the first set of channels. In some implementations, the modified transmission power is determined using transmission information of the spectrum usage data, which indicates a transmission power at which the licensed entity conducts transmission. The modified transmission power is lower than the transmission power of the licensed entity. In some implementations, the modified transmission power is determined based at least in part on a level of interference caused at a receiver of the transmissions of the licensed entity due to the wireless transmission of the wireless device. In some implementations, the modified transmission power is determined based at least in part on a relative location of the wireless device with respect to at least one of a location of the licensed entity or the area in which the licensed entity is licensed to communicate over the first sub-band. In some implementations, the modified transmission power is determined based at least in part on a power spectral density over distance of transmissions of at least one of the licensed entity or the integrated circuit package. In some implementations, the modified transmission power is determined based at least in part on a directionality of transmissions of the licensed entity. In some implementations, the modified transmission power is determined based at least in part on an antenna gain of an antenna of the licensed entity.

In some implementations, the wireless device is configured to estimate a level of interference caused at a receiver of the transmissions of the licensed entity due to the wireless transmissions of the wireless device. The wireless device can be configured to determine the modified transmission power that is estimated to result in interference at the receiver of less than a threshold interference level.

The wireless device is configured to determine a spectral separation between the adjacent channel and the licensed sub-band. For example, as shown in FIG. 6, a spectral separation 609 of approximately 8-10 MHz is between the 30 MHz sub-band and the adjacent channel 607. The lower boundary of the 30 MHz sub-band essentially overlaps the upper frequency boundary of the channel 605, so there is substantially no spectral separation between the adjacent channel 605 and the 30 MHz sub-band. In some implementations, the wireless device determines whether the spectral separation is less than a threshold. If the spectral separation between a first adjacent channel and the sub-band is less than the threshold (e.g., spectral separation is substantially zero between channel 605 and 30 MHz sub-band), the wireless device determines transmits on the first adjacent channel with the modified transmission power. If the spectral separation between a second adjacent channel and the sub-band is not less than the threshold (e.g., larger spectral separation between channel 607 and 30 MHz sub-band), the wireless device conducts transmissions on the second adjacent channel using a transmission power larger than the modified transmission power.

Figure 7:
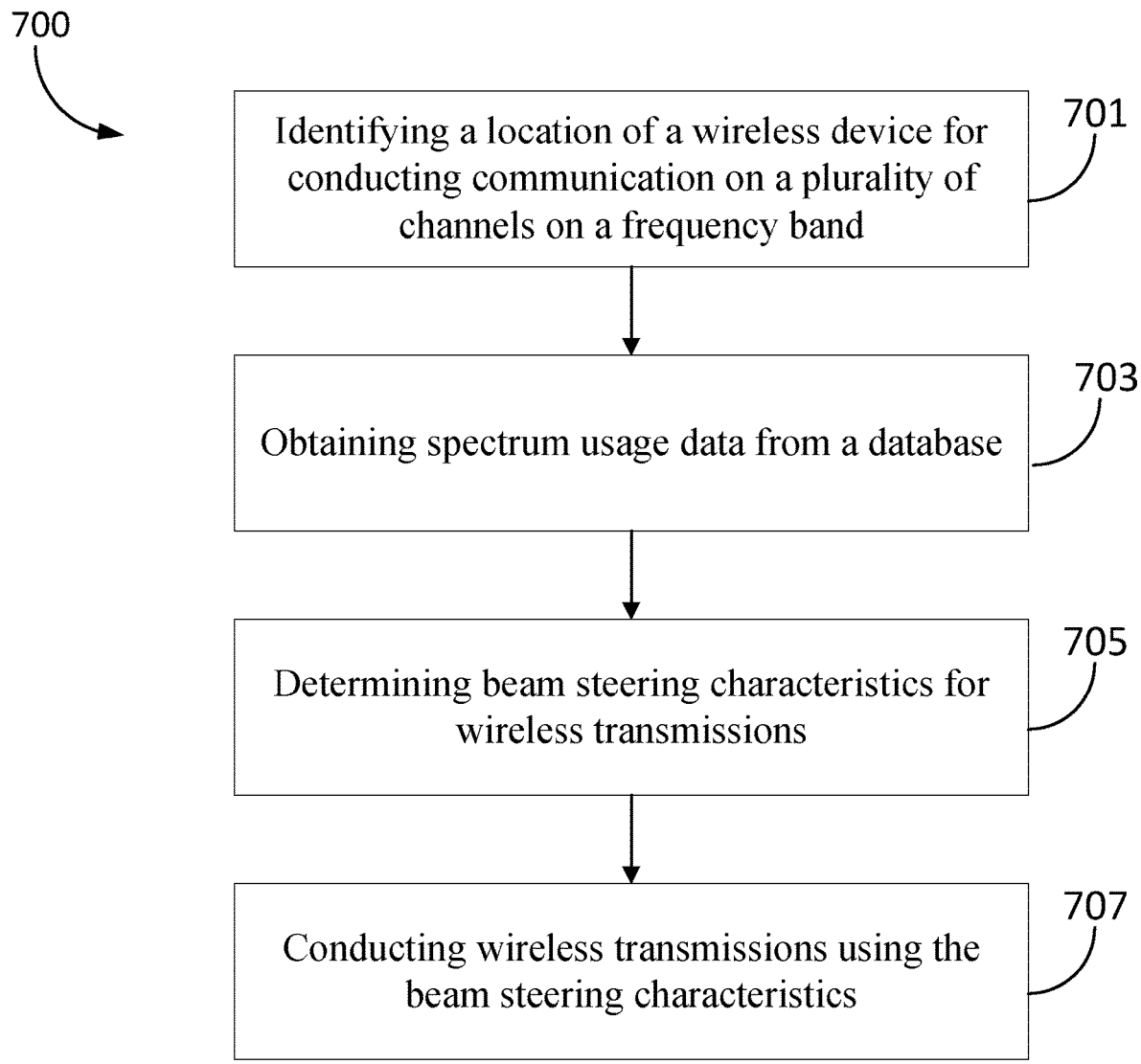
FIG. 7 is a flow diagram depicting a beam steering process according to an illustrative implementation.

Referring to FIG. 7, a flow diagram of a beam steering process 700 is depicted according to an illustrative implementation. In some implementations, the beam steering process 700 may be implemented using beam steering module 213 of wireless device 200.

At operation 701, the wireless device identifies the location of the device. The location of the device is identified using a positioning circuitry of device. In some implementations, the location of the device is identified using positioning data received from other devices. In some implementations, the location of the device is transmitted to a system maintaining a database of spectrum usage in one or more geographic areas. For example, the location may be provided as part of a query from the device to a spectrum access system, and the spectrum access system may respond to the query with spectrum usage data relevant to an area including or proximate to the location. In some implementations, the device may use the determined location to filter data received from the database that includes a larger geographic area to determine the data relevant to the location.

At operation 703, the wireless device receives spectrum usage data from the spectrum access system. The spectrum access system includes a database used to store the data. The received spectrum usage data is associated with wireless transmissions at an area including the location of the wireless device. The spectrum usage data indicates a licensed entity licensed within the area to communicate across a first sub-band of frequencies within the frequency band. The spectrum usage data indicates one or more transmission characteristics of the transmissions of the licensed entity including data indicating a source location and a directionality of the transmissions. In some implementations, the spectrum usage data indicates a beam steering requirement for the wireless device at the area.

At operation 705, beam steering characteristics for wireless transmissions of the wireless device within the frequency band are determined using the spectrum usage data. The beam steering characteristics are determined using the transmission characteristics for the licensed entity. The beam steering characteristics are determined to reduce interference with the transmissions of the licensed entity within the frequency band caused by the wireless transmissions of the wireless device. In some implementations, the wireless device determines that the device is within a beam path of the licensed entity based on the source location and directionality of the transmission of the licensed entity indicated by the transmission characteristics. The beam steering characteristics for the wireless transmissions are modified to reduce interference based on the beam path of the licensed entity. In some implementations, the beam steering characteristics are determined based at least in part on the beam steering requirement indicated by the spectrum usage data.

At operation 707, the wireless device conducts wireless transmissions using the beam steering characteristics. The beam characteristics include, but are not limited to, a beam orientation, a beam polarization, a beam elevation, a beam azimuth, and a beam cross-polarization discrimination. For example, in some implementations, the spectrum usage data may indicate that the licensed transmissions have a first polarization, and the wireless device may set a polarization of its transmissions such that the polarization causes the transmissions not to interfere. In some implementations, the spectrum usage data may indicate a particular beam path for the licensed transmissions, and the wireless device may select a beam elevation/azimuth to ensure that the beams transmitted by the wireless device do not intersect with those of the licensed entity in a manner that would result in impermissible levels of interference.

In some implementations, the wireless device includes multiple antennas. In such implementations, a subset of the antennas is determined and used for conducting transmissions based on a directionality of the wireless transmissions of the antennas. For example, the wireless device may include five antennas, and the wireless device may transmit on only three of the antennas because it determines that transmissions on those three antennas will not substantially interfere with the licensed transmissions while transmissions on the other antennas could interfere.

In some implementations, spectrum sharing by coexistence based on per-channel enablement is enabled via the SAS 100 for a wide channel bandwidth. In some implementations, the wide channel bandwidth is wider than a bandwidth of the TV White Space (e.g. 80 MHz and 160 MHz channels). In some implementations, multiple communication systems may exist within the wide channel bandwidth and theses communication systems may not follow the same channelization boundaries. The SAS 100 indicates to an enabling device a list of enumerated Resource Units (RUs) that are available within each channel according to some implementations. For example, in IEEE 802.11ax, a RU has a narrow bandwidth of 2 MHz according to some implementations. The enabling device then indicates the same list of available RUs to a dependent device by over-the-air signaling according to some implementations. Both of the enabling and dependent devices may only transmit on the indicated RUs according to some implementations. In some implementations, if the enabling device schedules the dependent device to transmit (e.g. by sending an 802.11ax MU trigger frame), it may only schedule the dependent device to transmit on the RUs that have been indicated as being available to the dependent device. In this way, transmission on disallowed RUs is avoided. In some implementations, the SAS 100 provides indication on a per-RU basis, which allows efficient use of the spectrum by only blocking out the necessary RUs that are required to prevent interference between the communication systems.

In some implementations, when the SAS 100 determines the availability of certain RUs, out-of-band emissions may occur to other communication systems that are operating in spectrum adjacent to those RUs due to the interference impact. In some implementations, the SAS 100 may be configured to make assumptions about the spectral mask capabilities of the transmitting device. In some implementations, the assumptions may vary significantly between device models. In some implementations, the SAS 100 may make overly-conservative assumptions to reduce the ability for some devices to use the spectrum efficiently.

In some implementations, the SAS 100 defines a spectral mask threshold at one or more frequency offsets (e.g. 100 kHz, 1 MHz, 10 MHz, etc. from the edge of the RU) that are used for transmission on a certain RU. In some implementations, if the transmitting device's spectral mask is below the spectral mask threshold, it indicates the RU is unavailable. In some implementations, if the spectral mask equals to the threshold at all offsets, it indicates a maximum transmission power is allowed for transmission. In some implementations, if the spectral mask exceeds the threshold at all offsets, it indicates a maximum transmission power is allowed for transmission and plus an additional delta offset so long as the effective spectral mask is not violated (e.g. also considering spectral regrowth). In some implementations, as a result, devices that have better spectral masks may transmit on more RUs at higher power, and hence use the spectrum more efficiently, while providing assurance that the interference caused to other communication systems may not exceed that allowed by the database.

In some implementations, the SAS 100 include antenna information indicating an antenna orientation for each device in the communication systems. In some implementations, antennas with good cross-polarization discrimination (XPD), control of the polarization used for transmission (and reception) by at least one of the communication systems may substantially reduce the amount of interference that is created between the communication systems.

In some implementations, the SAS 100 includes antenna information indicating polarization, orientation, and XPD of each communication system. In some implementations, the SAS 100 determines transmission power limits for transmission on each RU. In some implementations, the transmission power limits for a first communication system are determined according to the antenna information (e.g., polarization, orientation, XPD) of transmissions of the enabling and dependent devices within a second communication system. For example, in some implementations, the SAS 100 may allow transmission at +20 dBm on a given RU for the first communication system when a first polarization/orientation is used, or only +10 dBm when a second polarization/orientation is used, on the basis that, taking into account the polarization/orientation/XPD of the second communication system, the interference caused may be equivalent and tolerable.

In some implementations, for a device where the polarization/orientation and/or location is unknown (e.g. a mobile device), the SAS 100 may determine a third transmission power limit. In some implementations, the SAS 100 calculates the third transmission power limit according to an expected interference channel between the corresponding device of the first communication system and the second communication system. For example, in some implementations, higher relative transmission power limits may be allowed for a line-of-sight interference link where the polarization shift over the channel is predictable, as opposed to a non line-of-sight link through substantial clutter and/or specular reflections where the polarization of the interfering signal is altered and hence the same level of interference mitigation may not be assured. In some implementations, the SAS 100 allows a higher transmission power if the transmitting device of the first communication system adopts a specific beam pattern which provides predictable nulling of interference in the direction of the receiver(s) of the second communication system.

In some implementations, a communication system uses interference protection from a multitude of other communication systems, and it may be preferred to allow all the other communication systems to transmit with a reduced duty cycle, rather than enabling one (or a few) to transmit and block the others completely, which may improve user experience of the communication systems.

In some implementations, the SAS 100 includes information of a duty cycle limit and a transmission power limit that an enabling device and its dependent device are allowed to use. In some implementations, the SAS 100 provides this information to the enabling device. In some implementations, requiring a dependent device to follow a specified duty cycle limit may be undesirable because multiple dependent devices can exist, and the interference caused (which must be controlled) is the sum from all of them—hence applying a duty cycle limit on a per-device basis is over-conservative in order to avoid excessive interference if many of the devices decided to transmit at the same time. In some implementations, it may be advantageous to only allow the dependent devices to transmit data frames in response to a trigger frame transmitted by the enabling device. In some implementations, the enabling device then has centralized control over the transmissions of the dependent devices as a whole, to ensure the aggregate interference the communication system causes is controlled. In order to do so, in some implementations, the enablement indication additionally contains a flag that indicates that the dependent devices are not allowed to transmit SU (autonomous) data frames, and are allowed to only transmit data frames in response to a MU trigger.

In some implementations, a device may request update of allowed channels after a defined period or when it believes it is no longer in an allowed zone, but this is insufficient for cases where transmissions are allowed indoors only (e.g. to ensure additional mitigation from indoor/outdoor penetration loss to other systems that are outdoors).

In some implementations, the SAS 100 includes information indicating an exact indoor/outdoor boundary (e.g., boundary coordinates of a building). In some implementations, the corresponding coordinates are provided to a dependent device as part of an enablement response. In some implementations, the dependent device is obliged to measure its location at a cadence and accuracy which are also defined in the enablement response. For example, when the dependent device measures its location to be outside of an indoor boundary, and/or with insufficient accuracy, it stops transmitting on the corresponding spectrum until it confirms its location is within the boundary again.

In some implementations, client devices (STAs) regularly scan for APs, particularly in mobility scenarios where they handoff/roam to maintain the best quality connection. In some implementations, such scanning is power consuming, especially with a large number of channels/bands to scan. In some implementations, scanning channels that are unavailable, or largely unavailable due to few RUs being available, is wasteful and negatively impacts user experience.

IEEE 802.11 defines Reduced Neighbor Report (RNR) elements which are transmitted by APs in Beacon and Probe Response frames, and indicate to a client device (STA) a list of neighboring APs and the channels on which they operate. In some implementations, a client device can use this list to prioritize it scanning process. In some implementations, the RNR element is extended to also indicate, along with the identifier (e.g. BSSID) and channel for each AP, which of those APs are operating on channels that are unavailable or have limited availability in terms of allowed RUs. In such implementations, the client device does not need to scan those channels (because they are unlikely to be suitable candidate APs to connect to), and hence optimize its scanning procedure.

In some implementations, the GDD procedure allows a dependent STA to transmit certain management frames on a channel, before having been enabled to use that channel for data frames. In some implementations, this is to enable a security association to be established to prevent malicious forging of enablement frames which could cause devices to use the channel without genuine enablement from a database of the SAS 100. However, while those management frames are relatively short and rare, they may in certain cases contribute to interference to other communication systems—particularly for example if the transmitting device is close to and in the main lobe of a highly directional receiver antenna of another communication system.

In some implementations, many APs are multi-band and may simultaneously operate on multiple channels where the same frequency-domain coexistence requirements do not exist (e.g. 2.4 and 5 GHz unlicensed bands where devices typically coexist using CSMA/CA time-domain sharing). Specifically, in some implementations, the enablement frames are extended to allow the enablement exchange to be conducted on a different band operated by the same AP (enabling device) by additionally specifying the BSSID on which enablement is to be performed. In some implementations, this exchange, in addition to being out-of-band (and so not creating interference to the other communication system), uses a security association set up on the BSS operating on the other band to ensure integrity of the exchange. In some implementations, in the case that the AP is single-band and may only operate on the spectrum for which frequency-domain coexistence is being performed, the AP (enabling device) advertises specific RUs and transmission power limit that may be used for the in-band enablement transmissions in random-access trigger-based uplink frames. In some implementations, these RUs can be selected to minimize interference caused to another system.

In some embodiments, an integrated circuit package configured for wireless communication includes circuitry configured to identify a location of the integrated circuit package and obtain spectrum usage data from a database. The spectrum usage data indicates a licensed entity licensed within an area including the location of the integrated circuit package to communicate across a first sub-band of frequencies within a frequency band. The frequency band includes a plurality of channels each having a fixed width. The circuitry is further configured to determine a first set of one or more of the plurality of channels containing the first sub-band of frequencies over which the licensed entity is licensed to communicate and to conduct wireless transmissions on a second set of one or more of the plurality of channels that do not contain the first sub-band of frequencies while disabling wireless transmissions on the first set of channels.

In some embodiments, a method for conducting wireless communication includes identifying, by a wireless device, a location of the wireless device and obtaining, at the wireless device, spectrum usage data from a database. The spectrum usage data indicates a licensed entity licensed within an area including the location of the wireless device to communicate across a first sub-band of frequencies within a frequency band. The frequency band includes a plurality of channels each having a fixed width. The method further includes determining, by the wireless device, a first set of one or more of the plurality of channels containing the first sub-band of frequencies over which the licensed entity is licensed to communicate and conducting wireless transmissions of the wireless device on a second set of one or more of the plurality of channels that do not contain the first sub-band of frequencies while disabling wireless transmissions on the first set of channels.

In some embodiments, one or more computer-readable storage media have instructions stored thereon that, when executed by at least one processor of a wireless device, cause the at least one processor to perform operations. The operations include identifying a location of the wireless device and obtaining spectrum usage data from a database. The spectrum usage data indicates a licensed entity licensed within an area including the location of the integrated circuit package to communicate across a first sub-band of frequencies within a frequency band. The frequency band includes a plurality of channels each having a fixed width. The operations further include determining a first set of one or more of the plurality of channels containing the first sub-band of frequencies over which the licensed entity is licensed to communicate and conducting wireless transmissions of the wireless device on a second set of one or more of the plurality of channels that do not contain the first sub-band of frequencies while disabling wireless transmissions on the first set of channels.

In some embodiments, an integrated circuit package configured for wireless communication includes circuitry configured to identify a location of the integrated circuit package and obtain spectrum usage data from a database. The spectrum usage data indicates a licensed entity licensed within an area including the location of the integrated circuit package to communicate across a first sub-band of frequencies within a frequency band. The frequency band includes a plurality of channels each having a fixed width. The circuitry is further configured to determine a modified transmission power using the spectrum usage data. The modified transmission power is configured to reduce interference with the licensed entity on the first sub-band. The circuitry is further configured to conduct wireless transmissions on at least one of a first set of one or more of the plurality of channels containing the first sub-band or an adjacent channel that is adjacent to the first set of channels at the modified transmission power.

In some embodiments, a method for conducting wireless communication by a device includes identifying a location of the device and obtaining spectrum usage data from a database. The spectrum usage data indicates a licensed entity licensed within an area including the location of the device to communicate across a first sub-band of frequencies within a frequency band. The frequency band includes a plurality of channels each having a fixed width. The method further includes determining a modified transmission power using the spectrum usage data. The modified transmission power is configured to reduce interference with the licensed entity on the first sub-band. The method further includes conducting, by the device, wireless transmissions on at least one of a first set of one or more of the plurality of channels containing the first sub-band or an adjacent channel that is adjacent to the first set of channels at the modified transmission power.

In some embodiments, one or more computer-readable storage media have instructions stored thereon that, when executed by at least one processor of a device, cause the at least one processor to perform operations. The operations include identifying a location of the device and obtaining spectrum usage data from a database. The spectrum usage data indicates a licensed entity licensed within an area including the location of the device to communicate across a first sub-band of frequencies within a frequency band. The frequency band includes a plurality of channels each having a fixed width. The operations further include determining a modified transmission power using the spectrum usage data. The modified transmission power is configured to reduce interference with the licensed entity on the first sub-band. The operations further include conducting wireless transmissions on at least one of a first set of one or more of the plurality of channels containing the first sub-band or an adjacent channel that is adjacent to the first set of channels at the modified transmission power.

In some embodiments, an integrated circuit package configured for wireless communication includes circuitry configured to identify a location of the integrated circuit package and obtain spectrum usage data from a database. The spectrum usage data indicates a licensed entity licensed within an area including the location of the integrated circuit package to communicate across a frequency band. The spectrum usage data indicates one or more transmission characteristics of the transmissions of the licensed entity including data indicating a source location and a directionality of the transmissions. The circuitry is further configured to determine beam steering characteristics for wireless transmissions of the integrated circuit package within the frequency band using the spectrum usage data. The beam steering characteristics are determined using the transmission characteristics for the licensed entity and configured to reduce interference with the transmissions of the licensed entity within the frequency band caused by the wireless transmissions of the integrated circuit package. The circuitry is further configured to conduct wireless transmissions over the frequency band using the beam steering characteristics.

In some embodiments, a method for conducting wireless communication by a device includes identifying a location of the device and obtaining spectrum usage data from a database. The spectrum usage data indicates a licensed entity licensed within an area including the location of the device to communicate across a frequency band. The spectrum usage data indicates one or more transmission characteristics of the transmissions of the licensed entity including data indicating a source location and a directionality of the transmissions. The method further includes determining beam steering characteristics for wireless transmissions of the device within the frequency band using the spectrum usage data. The beam steering characteristics are determined using the transmission characteristics for the licensed entity and configured to reduce interference with the transmissions of the licensed entity within the frequency band caused by the wireless transmissions of the device. The method further includes conducting wireless transmissions over the frequency band using the beam steering characteristics.

In some implementations, one or more computer-readable storage media have instructions stored thereon that, when executed by at least one processor of a wireless device, cause the at least one processor to perform operations. The operations include identifying a location of the wireless device and obtaining spectrum usage data from a database. The spectrum usage data indicates a licensed entity licensed within an area including the location of the wireless device to communicate across a frequency band. The spectrum usage data indicates one or more transmission characteristics of the transmissions of the licensed entity including data indicating a source location and a directionality of the transmissions. The operations further include determining beam steering characteristics for wireless transmissions of the wireless device within the frequency band using the spectrum usage data. The beam steering characteristics are determined using the transmission characteristics for the licensed entity and configured to reduce interference with the transmissions of the licensed entity within the frequency band caused by the wireless transmissions of the wireless device. The operations further include conducting wireless transmissions over the frequency band using the beam steering characteristics.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It should be noted that certain passages of this disclosure can reference terms such as "first" and "second" in connection with devices, arrays, direction, etc., for purposes of identifying or differentiating one from another or from others. These terms are not intended to merely relate entities (e.g., a first device and a second device) temporally or according to a sequence, although in some cases, these entities can include such a relationship. Nor do these terms limit the number of possible entities (e.g., devices) that can operate within a system or environment.

Those of skill in the art would appreciate that the various illustrative blocks, modules, elements, components, and methods described herein may be implemented as electronic hardware, computer software, or combinations of both. To illustrate this interchangeability of hardware and software, various illustrative blocks, modules, elements, components, and methods have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The word "example" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. An integrated circuit package, the integrated circuit package comprising:
   a circuitry configured to:
      identify a location of the integrated circuit package;
      obtain spectrum usage data from a database, the spectrum usage data indicating a licensed entity licensed within an area including the location of the integrated circuit package to communicate across a frequency band, the spectrum usage data indicating one or more transmission characteristics of transmissions of the licensed entity including data indicating a directionality of the transmissions;
      determine beam steering characteristics within the frequency band using the spectrum usage data, the beam steering characteristics determined using the transmission characteristics of the transmissions of the licensed entity and configured to reduce interference with the transmissions of the licensed entity within the frequency band caused by the transmissions of the integrated circuit package; and
      conduct transmissions from the integrated circuit package over the frequency band using the beam steering characteristics.

2. The integrated circuit package of claim 1, wherein the beam steering characteristics comprise at least one of a beam orientation, a beam polarization, a beam elevation, a beam azimuth, or a beam cross-polarization discrimination.

3. The integrated circuit package of claim 1, wherein the circuitry is configured to:
   determine that the integrated circuit package is within a beam path of the licensed entity based on the location and directionality of a transmission of the licensed entity indicated by the transmission characteristics of the spectrum usage data; and
   modify the beam steering characteristics for the transmissions of the integrated circuit package to reduce interference based on the beam path of the licensed entity.

4. The integrated circuit package of claim 3, wherein the integrated circuit package comprises a plurality of antennas, and wherein the circuitry is configured to determine the beam steering characteristics by determining a subset of the antennas to use for the transmissions based on the directionality of the transmissions.

5. The integrated circuit package of claim 4, wherein the integrated circuit package is a WiFi access point.

6. The integrated circuit package of claim 1, wherein the frequency band includes a frequency of 6 GHz.

7. The integrated circuit package of claim 1, wherein the spectrum usage data comprises beam steering requirements for the transmissions in the frequency band within the area, and wherein the circuitry is configured to determine the beam steering characteristics using the beam steering requirements of the spectrum usage data.

8. A method of conducting communication by a device, the method comprising:
   identifying a location of the device;
   obtaining usage data from a database, the usage data indicating a licensed entity licensed within an area including the location to communicate across a frequency band, the usage data indicating one or more transmission characteristics of the transmissions of the licensed entity including data indicating a source location and a directionality of the transmissions;
   determining steering characteristics for transmissions of the device within the frequency band using the usage data, the steering characteristics determined using the transmission characteristics for the licensed entity and configured to reduce interference with the transmissions of the licensed entity within the frequency band caused by the transmissions of the device; and
   conducting transmissions from the device over the frequency band using the steering characteristics.

9. The method of claim 8, wherein the steering characteristics comprise at least one of a beam orientation, a beam polarization, a beam elevation, a beam azimuth, or a beam cross-polarization discrimination.

10. The method of claim 8, further comprising:
    determining that the device is within a beam path of the licensed entity based on the source location and directionality of a transmission of the licensed entity indicated by the transmission characteristics of the usage data; and
    modifying the steering characteristics for the transmissions of the device to reduce interference based on the beam path of the licensed entity.

11. The method of claim 10, wherein the device comprises a plurality of antennas, and wherein the method further comprises determining the steering characteristics by determining a subset of the antennas to use for the transmissions in response to the directionality of the transmissions.

12. The method of claim 8, wherein the frequency band includes a frequency of 6 GHz.

13. The method of claim 8, wherein the usage data comprises beam steering requirements for the transmissions from the device in the frequency band within the area, and wherein circuitry of the device is configured to determine the steering characteristics using the beam steering requirements of the usage data.

14. One or more non-transitory computer-readable storage media having instructions stored thereon that, when executed by at least one processor of a device, cause the at least one processor to perform operations comprising:
obtaining from a database, usage data indicating a licensed entity licensed within an area including a location of the device to communicate across a frequency band, the usage data indicating one or more transmission characteristics of the transmissions of the licensed entity including data indicating a source location and a directionality of the transmissions;
determining steering characteristics for transmissions of the device within the frequency band using the usage data, the steering characteristics determined using the transmission characteristics for the licensed entity and configured to reduce interference with the transmissions of the licensed entity within the frequency band caused by the transmissions of the device; and
conducting transmissions from the device over the frequency band using the steering characteristics.

15. The one or more non-transitory computer-readable storage media of claim 14, wherein the steering characteristics comprise at least one of a beam orientation, a beam polarization, a beam elevation, a beam azimuth, or a beam cross-polarization discrimination.

16. The one or more non-transitory computer-readable storage media of claim 14, wherein the operations further comprise:
determining that the device is within a beam path of the licensed entity based on the source location and directionality of a transmission of the licensed entity indicated by the transmission characteristics of the usage data; and
modifying the steering characteristics for the transmissions of the device to reduce interference based on the beam path of the licensed entity.

17. The one or more non-transitory computer-readable storage media of claim 16, wherein the device comprises a plurality of antennas, and wherein the operations further comprise determining the steering characteristics by determining a subset of the antennas to use for the transmissions in response to the directionality of the transmissions.

18. The one or more non-transitory computer-readable storage media of claim 17, wherein the device is a WiFi access point.

19. The one or more non-transitory computer-readable storage media of claim 14, wherein the frequency band includes a frequency of 6 GHz.

20. The one or more non-transitory computer-readable storage media of claim 14, wherein the usage data comprises steering requirements for the transmissions from the device in the frequency band within the area, and wherein circuitry of the device is configured to determine the steering characteristics using the steering requirements of the usage data.

* * * * *